United States Patent [19]
Cox et al.

[11] 3,762,408
[45] Oct. 2, 1973

[54] VENTILATORS

[75] Inventors: Lawrence Alfred Cox, North Weald; David James Dell, Eaton, Bray, both of England

[73] Assignee: The British Oxygen Company Limited, London, England

[22] Filed: Nov. 11, 1971

[21] Appl. No.: 197,709

[52] U.S. Cl. ........................... 128/145.8, 137/599.1
[51] Int. Cl. ............................................ A61m 16/00
[58] Field of Search ...................... 128/145.5, 145.6, 128/145.7, 145.8, 188, 142, 143, 142.2; 137/1, 2, 12, 14, 599, 599.1; 222/1, 3

[56] References Cited
UNITED STATES PATENTS
3,471,674  10/1969  Gage .................................. 137/599
3,672,366  6/1972  Burchell ......................... 128/145.8

Primary Examiner—Richard A. Gaudet
Assistant Examiner—G. F. Dunne
Attorney—Robert I. Dennison et al.

[57] ABSTRACT

A lung ventilator which can control the flow rate of gas supplied to a patient so as to produce an increasing flow pattern, a constant flow pattern, or a decreasing flow pattern. The change from one flow pattern to another is effected solely by switching appropriate valves in the gas flow circuit of the ventilator.

7 Claims, 1 Drawing Figure

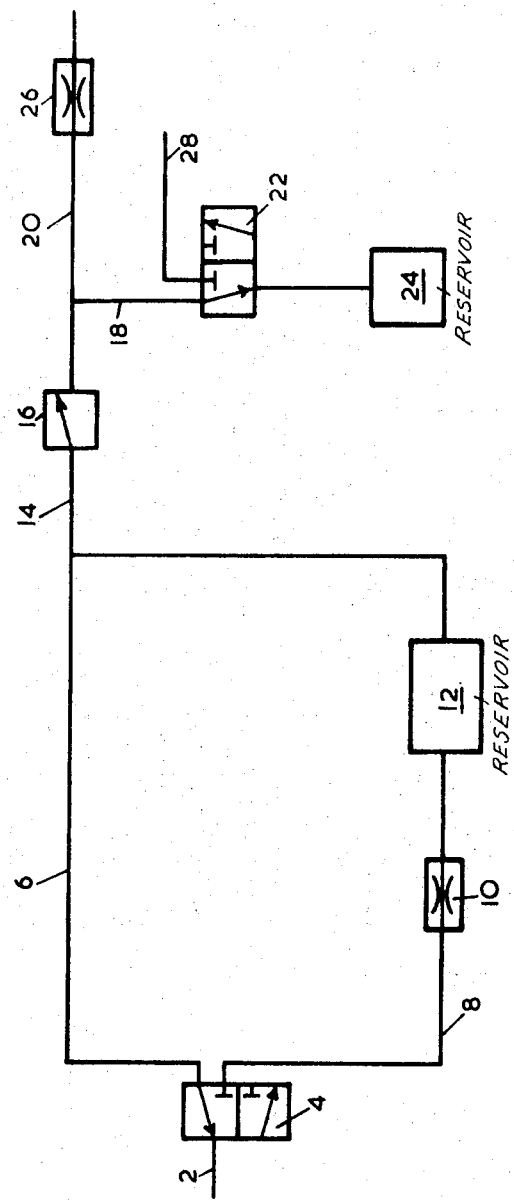

VENTILATORS

FIELD OF THE INVENTION

The invention relates to ventilators, and particularly to lung ventilators which are devices for maintaining or assisting respiration in patients not able to breathe normally without assistance.

DESCRIPTION OF THE PRIOR ART

It is known that the efficiency of pulmonary gas exchange depends upon the gas flow pattern of the ventilator, although the optimum ventilatory flow pattern has not yet been defined or established.

By "flow pattern" in this specification is meant the variation of flow rate with time. The term "increasing flow pattern" means that the flow rate during the inspiratory phase increases with time, the term "decreasing flow pattern" means that the flow rate during the inspiratory phase decreases with time, and the term "constant flow pattern" means that the flow rate during the inspiratory phase remains constant.

SUMMARY OF THE INVENTION

The present invention aims at providing a lung ventilator presenting a choice of different flow patterns.

The term "gas" used in the specification covers a single gas or a mixture of gases.

Accordingly, the present invention provides a lung ventilator including a path for the flow of gas to a patient; a first gas reservoir in the path, the path having therein upstream of the said reservoir an orifice of reduced cross-sectional area, a valved bypass path extending from upstream of the said orifice to immediately downstream of the reservoir, the path having a similar orifice therein downstream of the first reservoir and the bypass path, the downstream orifice being of larger cross-sectional area than the upstream orifice; a valve in the path between the bypass path and the downstream orifice; and a secong gas reservoir having its interior able to be placed selectively in communication with the atmosphere or the path between the said valve and the downstream orifice.

The invention also provides methods of operating the above-mentioned lung ventilator to obtain a decreasing flow pattern, an increasing flow pattern or a constant flow pattern.

The present invention will now be described by way of example with reference to the accompanying drawing which is a circuit diagram of one form of lung ventilator of the present invention.

Referring to the drawing, a gas inlet 2 from a gas source (not shown) is connected to an inlet port of a two-position, three-port valve 4. The outlet ports of the valve 4 are connected to a constant flow line 6 and to a decreasing flow line 8. An inlet orifice 10 and a reservoir 12 are located in the line 8. The lines 6 and 8 join to form a supply line 14 having a two-position, two-port valve 16 located in it. The valve 16 is the main control valve by which gas flow through the ventilator from the source to a patient is switched on and off at the beginning and end respectively of each inspiratory cycle. The valve 16 is operated automatically by a suitable control device (not shown) forming part of the ventilator.

Downstream of the valve 16, the line 14 is divided into an increasing flow line 18 and an outlet line 20. The line 18 is connected to one outlet port of a two-position, three-port valve 22, and the line 20 leads to the patient. The inlet port of the valve 22 is connected to a reservoir 24 and the other outlet port is connected to a line 28 leading to the atmosphere. An outlet orifice 26 is located in the outlet line 20 downstream of the line 18. This outlet orifice 26 has a bore of larger cross-sectional area than that of the inlet orifice 10. The bore of the outlet orifice 26 defines the maximum flow rate of gas passing through the ventilator.

The ventilator can be operated with either a constant flow pattern, an increasing flow pattern or a decreasing flow pattern. These three modes of operation will now be described in turn as follows:

Constant Flow Pattern

The valve 4 is switched to connect the lines 2 and 6, the valve 16 is switched to connect the lines 14 and 20, and the valve 22 is switched to disconnect the line 18 from the reservoir 24 and the line 28.

Gas flows from the gas source along the line 2 through the valve 4 to the line 6. This gas passes through the valve 16 and outlet orifice 26 at the required rate to the patient. During each inspiratory phase of the lung ventilator, gas will flow through the ventilator to the patient. During each expiratory phase this gas flow will be cut off by a control circuit which closes the valve 16 to disconnect the lines 14 and 20.

Decreasing Flow Pattern

The valve 4 is switched to connect the lines 2 and 8, and the valves 16 and 22 remain as before. Gas flows from the line 2 to the line 8. This gas passes from the inlet orifice 10 through the reservoir 12 to the outlet orifice 26 and on to the patient. During each expiratory phase, the valve 16 is closed by the above mentioned control circuit thereby enabling the reservoir 12 to become filled with gas. During each inspiratory phase, the valve 16 is opened to allow gas to leave the reservoir 12 and pass through the orifice 26. Because the orifice 26 has a bore of larger cross-sectional area than that of the orifice 10, gas leaves the reservoir 12 faster than gas can enter the reservoir. This gives rise to a decreasing flow pattern during each inspiratory phase.

Increasing Flow Pattern

The valve 4 is switched to connect the lines 2 and 6, and the valve 16 is unchanged. During each inspiratory phase, the valve 22 is switched to connect the reservoir 24 to the line 18 thereby allowing some of the gas flowing along the line 14 to divert along the line 18 into the initially empty reservoir 24. During the inspiratory phase, the reservoir 24 progressively fills, thereby ensuring a progressively increasing flow pattern along the outlet line 20. During the following expiratory phase, the valve 16 is closed, and the valve 22 is switched to connect the reservoir 24 to the line 28 thereby enabling the gas in the reservoir 24 to be vented to atmosphere.

As previously mentioned, the maximum flow rate through the ventilator is defined by the bore of the outlet orifice 26. In this example, this bore provides a maximum flow rate of 10 litres per minute.

In the above-described ventilator, the orifices 10 and 26, and the reservoirs 12 and 24 are each of fixed cross-sectional area and internal volume respectively. It is possible for any or all of these components to be replaced by adjustable orifices or reservoirs, provided that the maximum cross-sectional area of the inlet orifice 10 is less than the minimum cross-sectional area of the outlet orifice 26.

In a modified lung ventilator, each one of the orifices and reservoirs is replaced by a series of orifices and reservoirs of steadily increasing cross-sectional area and volume respectively. This modified ventilator includes a suitable switching system to switch in selected orifices and reservoirs. In this way it is possible to select a chosen one of a range of flow patterns.

We claim :

1. A lung ventilator including a path for the flow of gas to a patient; a first gas reservoir in the path, the path having therein upstream of the said reservoir an orifice of reduced cross-sectional area, a valved bypass path extending from upstream of the said orifice to immediately downstream of the reservoir, said bypass path having having an orifice therein downstream of said first reservoir and said bypass path, the downstream orifice being of larger cross-sectional area then the upstream orifice; a valve in the path between the bypass path and the downstream orifice; and a second gas reservoir, conduit means connecting said second reservoir to said bypass path, valve means in said conduit selectively connectable with the atmosphere or the path between the said valve and the downstream orifice.

2. A lung ventilator as claimed in claim 1 including a valved diversion path extending from the second reservoir to the flow path between the said valve and the downstream orifice.

3. A lung ventilator as claimed in claim 2 including a two-position, three-port valve located in the diversion path.

4. A lung ventilator as claimed in claim 1 in which the cross-sectional area of at least one of the orifices is adjustable.

5. A lung ventilator as claimed in claim one in which the internal volume of at least one of the reservoirs is adjustable.

6. A lung ventilator as claimed in claim 1 including a plurality of orifices in which each orifice is able to be switched selectively into its operational position.

7. A lung ventilator as claimed in claim 1 including a plurality of reservoirs in which each reservoir is able to be switched selectively into its operational position.

* * * * *